United States Patent
Xia et al.

(10) Patent No.: US 10,397,132 B2
(45) Date of Patent: Aug. 27, 2019

(54) SYSTEM AND METHOD FOR GRANTING VIRTUALIZED NETWORK FUNCTION LIFE CYCLE MANAGEMENT

(71) Applicant: Futurewei Technologies, Inc., Plano, TX (US)

(72) Inventors: Haitao Xia, Beijing (CN); Zhixian Xiang, Frisco, TX (US); Aijuan Feng, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 231 days.

(21) Appl. No.: 15/638,246

(22) Filed: Jun. 29, 2017

(65) Prior Publication Data

US 2018/0295067 A1 Oct. 11, 2018

Related U.S. Application Data

(60) Provisional application No. 62/483,873, filed on Apr. 10, 2017, provisional application No. 62/483,215, filed on Apr. 7, 2017.

(51) Int. Cl.
*H04L 12/917* (2013.01)
*G06F 9/50* (2006.01)
(Continued)

(52) U.S. Cl.
CPC .......... *H04L 47/76* (2013.01); *G06F 9/5077* (2013.01); *H04L 41/5003* (2013.01); *H04L 47/781* (2013.01); *H04L 47/805* (2013.01); *G06F 9/45558* (2013.01); *G06F 2009/4557* (2013.01); *G06F 2009/45595* (2013.01); *H04L 41/08* (2013.01)

(58) Field of Classification Search
CPC ... H04L 47/76; H04L 47/781; H04L 41/5003; H04L 41/08; G06F 9/5077; G06F 9/45558; G06F 2009/4557; G06F 2009/45595
See application file for complete search history.

(56) References Cited

U.S. PATENT DOCUMENTS

2014/0317293 A1* 10/2014 Shatzkamer ............ G06F 9/455
 709/226
2016/0057102 A1* 2/2016 Wei ...................... H04L 61/2007
 709/226

(Continued)

*Primary Examiner* — Michael Won
(74) *Attorney, Agent, or Firm* — FutureWei Technologies, Inc.

(57) ABSTRACT

A virtualized network function (VNF) life cycle management (LCM) method is disclosed that includes sending, by a virtualized network function manager (VNFM), a grant request for a VNF LCM operation to a network functions virtualization orchestrator (NFVO), wherein the grant request comprises a requested wide area network (WAN) connectivity requirement for connecting multiple sites that virtualized network function components (VNFCs) of the virtualized network function (VNF) instance are placed in, and the VNF comprises at least two VNFCs placed in different sites. In this embodiment the method also includes receiving, by the VNFM, a grant response from the network functions virtualization orchestrator (NFVO), wherein the grant response comprises WAN Infrastructure Manager (WIM) information and a granted WAN connectivity requirement approved by the NFVO.

23 Claims, 10 Drawing Sheets

(51) Int. Cl.
*H04L 12/911* (2013.01)
*H04L 12/24* (2006.01)
*H04L 12/927* (2013.01)
*G06F 9/455* (2018.01)

(56) References Cited

U.S. PATENT DOCUMENTS

2016/0328259 A1* 11/2016 Xia ..................... G06F 9/45558
2018/0004576 A1*  1/2018 Gokurakuji ......... G06F 9/45558
2018/0011730 A1*  1/2018 Zembutsu ................ G06F 9/46
2018/0013586 A1*  1/2018 Wang ..................... H04L 12/46
2018/0295067 A1* 10/2018 Xia .......................... H04L 47/76
2019/0052528 A1*  2/2019 Yoshimura .......... H04L 41/0813

* cited by examiner

SYSTEM AND METHOD FOR GRANTING VIRTUALIZED NETWORK FUNCTION LIFE CYCLE MANAGEMENT

CROSS-REFERENCE TO RELATED APPLICATIONS

This application is a continuation of U.S. Provisional Patent Application Ser. No. 62/483,215, filed Apr. 7, 2017, entitled "System and Method for Granting Virtualized Network Function Life Cycle Management," and U.S. Provisional Patent Application Ser. No. 62/483,873 filed Apr. 10, 2017, entitled "System and Method for Granting Virtualized Network Function Life Cycle Management" which are hereby incorporated herein by reference as if reproduced in full.

TECHNICAL FIELD

The present disclosure relates to network function virtualization (NFV), and, in particular embodiments, to a system and method for virtualized network function (VNF) life cycle management (LCM).

BACKGROUND

NFV is an industry effort to transform the way that network operators architect networks by evolving standard IT virtualization technology to consolidate many network equipment types onto industry standard high volume servers, switches and storage, with the goal of cost reduction and efficient network operation and maintenance. In non-virtualized networks, network functions (NFs) are implemented as a combination of vendor specific software and hardware.

SUMMARY

A first aspect of example embodiment includes virtualized network function (VNF) life cycle management (LCM) method performed by a virtualized network function manager (VNFM). In the method, the VNFM sends a grant request for a VNF LCM operation to a network functions virtualization orchestrator (NFVO), wherein the grant request comprises a wide area network (WAN) connectivity requirement for connecting multiple sites that virtualized network function components (VNFCs) of the virtualized network function (VNF) instance are placed in, and the VNF to be operated comprises at least two VNFCs placed in different sites. And then, the VNFM receives a grant response from the network functions virtualization orchestrator (NFVO), wherein the grant response comprises WAN infrastructure manager (WIM) identifier and a granted WAN connectivity requirement approved by the NFVO, wherein, the granted WAN connectivity requirement describes a granted requirement for managing a WAN connectivity connecting the multiple sites across a WAN. And then, the VNFM sends a resource allocation request to the WIM according to the WIM identifier, wherein the resource allocation request comprises requested WAN network resource information derived from the granted WAN connectivity requirement. Through the above embodiment, the VNFM includes the WAN connectivity requirement in the grant request for connecting multiple sites. It can improve the performance of VNF and the associated NS during their lifecycle management, because the VNFM has the best knowledge on the VNF instance and its constituents, including the requirements for WAN connectivity.

An second aspect of example embodiment includes virtualized network function (VNF) life cycle management (LCM) method performed by a network functions virtualization orchestrator (NFVO). In the method, the NFVO, receives a grant request for a VNF LCM operation from a virtualized network function manager (VNFM), wherein the grant request comprises a requested wide area network (WAN) connectivity requirement for connecting multiple sites that virtualized network function components (VNFCs) of the virtualized network Function (VNF) instance are placed in, and the VNF to be operated comprises at least two VNFCs placed in different sites. And then the NFVO determines a WAN connectivity for connecting the multiple sites across a WAN according to the requested WAN connectivity requirements. And then the NFVO returning a grant response to the VNFM; wherein, the grant response comprises a WIM identifier and a granted WAN connectivity requirement approved by the NFVO, wherein, the granted WAN connectivity requirement describes a granted requirement for managing the WAN connectivity connecting the multiple sites across the WAN. Through the above embodiment, the VNFM includes the WAN connectivity requirement in the grant request for connecting multiple sites. It can improve the performance of VNF and the associated NS during their lifecycle management, because the VNFM has the best knowledge on the VNF instance and its constituents, including the requirements for WAN connectivity.

An third aspect of example embodiment virtualized network function manager (VNFM). Where, the VNFM comprise a processor and a network interface. The processor generates a grant request for a virtualized network function (VNF) life cycle management (LCM) operation, wherein the grant request comprises a requested wide area network (WAN) connectivity requirement for connecting multiple sites that virtualized network function components (VNFCs) of the virtualized network function (VNF) instance are placed in, and the VNF to be operated comprises at least two VNFCs placed in different sites. And the network interface sends the grant request to a network functions virtualization orchestrator (NFVO) and receives a grant response from the NFVO, wherein the grant response comprises WAN infrastructure manager (WIM) identifier and a granted WAN connectivity requirement approved by the NFVO, wherein, the granted WAN connectivity requirement describes a granted resource requirement for managing a WAN connectivity connecting the multiple sites across a WAN, wherein the network interface further sends a resource allocation request to the WIM according to the WIM identifier, wherein the resource allocation request comprises the requested WAN network resource information derived from the granted WAN connectivity requirement. Through the above embodiment, the VNFM includes the WAN connectivity requirement in the grant request for connecting multiple sites. It can improve the performance of VNF and the associated NS during their lifecycle management, because the VNFM has the best knowledge on the VNF instance and its constituents, including the requirements for WAN connectivity.

An fourth aspect of example embodiment includes a network functions virtualization orchestrator (NFVO). Where, the NFVO includes a network interface and a processor. The network interface receives a grant request for a virtualized network function (VNF) life cycle management (LCM) operation from a virtualized network function manager (VNFM), wherein grant request comprises a requested wide area network (WAN) connectivity requirement for connecting multiple sites that virtualized network function components (VNFCs) of the virtualized network Function (VNF) are place in, and the VNF to be operated comprises at least two VNFCs placed in different sites. And the processor determines a WAN connectivity for connecting the multiple sites across a WAN according to the requested WAN connectivity requirements, wherein the network interface further returns a grant response to the VNFM; wherein, the grant response comprises a WIM identifier and a granted WAN connectivity requirement approved by the NFVO, wherein, the granted WAN connectivity requirement describes a granted requirement for managing the WAN connectivity connecting the multiple sites across the WAN. Through the above embodiment, the VNFM includes the WAN connectivity requirement in the grant request for connecting multiple sites. It can improve the performance of VNF and the associated NS during their lifecycle management, because the VNFM has the best knowledge on the VNF instance and its constituents, including the requirements for WAN connectivity.

A fifth aspect of example embodiment includes a virtualized network function manager (VNFM). Wherein the VNFM includes the function of the VNFM in the first aspect of example embodiment. The functions may be realized by hardware, or may be realized by software which are performed by hardware. And the hardware or the software include one or more module corresponding to the functions.

A sixth aspect of example embodiment includes a network functions virtualization orchestrator (NFVO). Wherein the NFVO includes the function of the NFVO in the second aspect of example embodiment. The functions may be realized by hardware, or may be realized by software which are performed by hardware. And the hardware or the software include one or more module corresponding to the functions.

A seventh aspect of example embodiment includes a computer storage media. Where the computer storage media stores instructions performed by the VNFM in the first or the third aspect of example embodiment, and stores the program performed in the first or the third aspect of example embodiment.

An eighth aspect of example embodiment includes a computer storage media. Where the computer storage media stores instructions performed by the NFVO in the second or the fourth aspect of example embodiment, and stores the program performed in the second or the fifth aspect of example embodiment.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
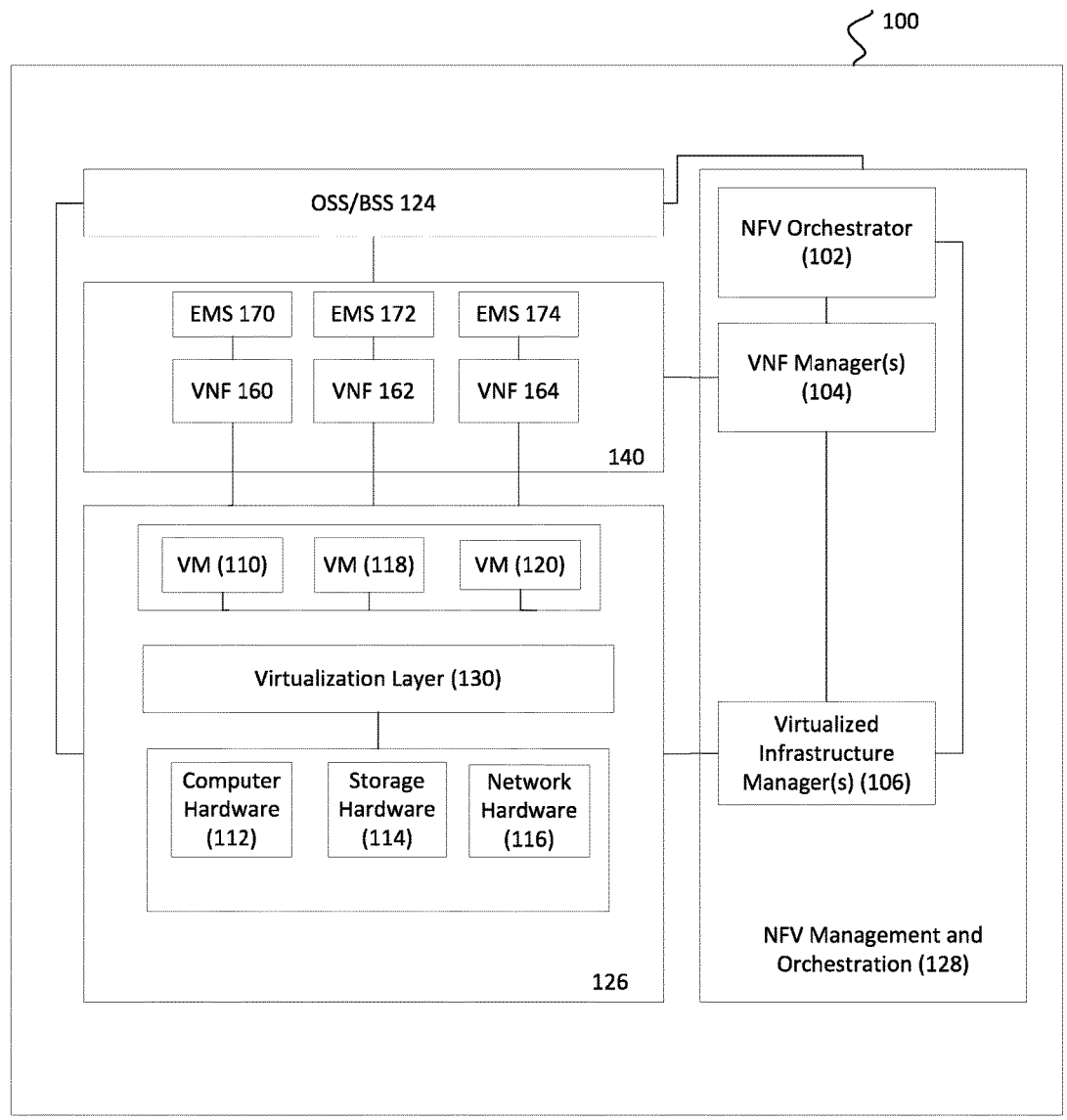
FIG. 1 is a block diagram of an NFV system according to one embodiment of the present disclosure.

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

In some NFV environments, NFs are separated from the hardware they run on using virtual hardware abstraction to virtualize entire classes of NFs into building blocks that may be connected, or chained, together to create communication services. Granting mechanism is widely used in virtualized resource management related to VNF LCM operations. This mechanism allows the Network Functions Virtualization Orchestrator (NFVO) to enforce the limitation of virtualized resource (related to the VNF or a group of VNFs) to virtualized network function manager (VNFM), and guarantee consistency of the network service (NS) managed by the NFVO.

The existing granting mechanism in NFV reflects a direct mode of interaction between the VNFM and the Virtualized Infrastructure Manager (VIM) for virtualized resource management related to one or multiple VNF instances managed by the VNFM.

For many reasons, such as security, high availability, disaster protection, different components of a VNF instance are deployed supporting geographical redundancy. Therefore, multiple network function virtualization infrastructure (NFVI) Points of Presence (NFVI PoP) is a common scenario for VNF instance deployment. The NFVI PoP is also called site. In this situation, the VNFM is responsible for requesting the VIM virtualized resources (compute, storage and network) of the Virtualized Network Function Component(s) (VNFC) in each site, and the NFVO is responsible for requesting a Wide Area Network (WAN) infrastructure manager (WIM) virtualized resource (i.e., WAN network resource) across multiple sites. The WIM is a management functional block which is typically used to establish connectivity between physical network function (PNF) endpoints and/or VNFs in different sites placing different constituents of a NS instance.

In embodiments of the disclosed solution, where multi-site NS aspects in NFV, a use case is defined for deploying a VNF across multiple sites. Different VNFCs (or VDUs) of the same VNF instance are deployed in different sites. And the term "site" is also used as NFVI Points of Presence (NFVI-PoP).

However, there is no granting solution for the multi-sites NS. Using the existing solution for managing the lifecycle of multi-site VNF instances will result in inefficient NFVI resource management because both the NFVO and the VNFM are involved in requesting virtualized resource management related to a VNF LCM operation, and leads to the performance decrease of VNF and the associated NS during their lifecycle management. In addition, as WAN network resource is considered as one kind of NFVI resource, NFVI resources allocated to the same VNF instance (i.e., the WAN network resource for connecting the VNFCs across multiple sites and the virtualized resources allocated to the VNFC(s) in each site) are initiated by two different management functional blocks, which are the NFVO and the VNFM respectively, the complexity and overhead by coordinating the two functional blocks are produced. Therefore, a new solution of VNF LCM is urgent for the scenario of multi-site VNF deployment.

FIG. 1 is a schematic diagram of an embodiment of an NFV system 100. Various elements of this system are described in the document entitled network functions virtualization (NFV): management and orchestration (NFV-MANO), ETSI NFV-MAN 001 v1.1.1 (2014 December), which is hereby incorporated into this application in its entirety by reference. The NFV system 100 may comprise an NFV management and orchestration (NFV-MANO) entity 128, an NFV infrastructure (NFVI) entity 126, a virtual function entity 140, and one or more operations support systems (OSSs) and business support systems (BSSs) (OSS/BSS) 124. The virtual function entity 140 may comprise a plurality of virtual network function (VNF) elements 160, 162, and 164, a plurality of element management system (EMS) elements 170, 172, and 174 that can be configured to perform the typical management functionality for the plurality of VNF elements 160, 162, and 164. While three (3) VNF and EMS elements are shown in FIG. 1, it is expressly contemplated that any number of these elements may be found in a system and the selection of three is purely for the purpose of convenience. Moreover, it is understood that alternate configurations are contemplated by this disclosure, e.g., where a plurality of VNF elements 160, 162, and 164 are controlled by a single EMS.

The VNF elements are used to perform a virtualization of a network function in a non-virtualised network. For example, the network functions in the non-virtualized network may be 3GPP Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. VNF 160 can be composed of one or more internal components, called virtualized network function components (VNFCs). Each VNFC provides a defined subset of that VNF's functionality, with the main characteristic that a single instance of this component maps 1:1 against a single virtualisation container. For example, one VNF can be deployed over multiple virtual machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFV-MANO entity 128 may be responsible for the operation, management, and coordination of VNF elements 160, 162, and 164 and the respective NFVI entity 126. The NFV-MANO entity 128 may comprise an NFV orchestrator (NFVO) entity 102, one or more VNF manager (VNFM) entities 104, and one or more Virtualized Infrastructure Manager (VIM) entities 106. The NFVO entity 102 can manage the network service (NS) lifecycle and coordinates the management of NS lifecycle, VNF lifecycle (supported by the VNFM entity 104) and NFVI resources (supported by the VIM entity 106) to ensure an optimized allocation of the necessary resources and connectivity. The VNFM entity 104 may communicate with VNF elements 160, 162, and 164 and be responsible for VNF lifecycle management (e.g. instantiation, update, query, scaling, and termination). For example, in one embodiment a VNFM entity 104 may be deployed for each VNF elements 160, 162, and 164. In other embodiments, a VNFM entity 104 may serve multiple VNF elements 160, 162, and 164. The VIM entity 106 can be responsible for controlling and managing the NFVI compute, storage and network resources. VIM entity 106 may be configured to control and manage the interaction of a VNF with the compute, storage and network resources in NFVI entity 126. For example, the VIM entity 106 may perform resource management functions, such as management of infrastructure resource and allocation (e.g. increase resources to VMs, improve energy efficiency, and resource reclamation). The VIM entity 106 and the VNFM entity 104 may communicate with each other for resource allocation requests and to exchange virtualized resource configuration and state information. The VNFM may also obtain the affinity rules and/or anti-affinity rules for the WAN connectivity, and/or dependency among the VNFCs from the VNF description (VNFD) of the VNF.

The NFVI entity 126 represents various hardware and software components which are used to build up the environment in which VNFs are deployed, managed and executed. For example, the hardware components in the NFVI entity 126 may include computing hardware 112, storage hardware 114, and network hardware 116 that provide processing, storage and connectivity to VNF entities 160, 162, and 164 through a virtualization layer 130. The computing hardware 112 may be any device configured to, designed to, or otherwise enabled to provide processing and computing resources. The storage hardware 114 may be any kind of device which is used to store information for later retrieval. Examples of storage devices include flash memory, magnetic rotation disks, optical disks, or any other mechanism capable of storing information for later retrieval. Storage hardware 114 may be differentiated between shared network attached storage (NAS) and local storage that is connected directly to the NFVI using an internal bus or other attachment mechanism. In one embodiment, the resources from the computing hardware 112 and storage hardware 114 may be pooled together. The network hardware 116 may be switches that are configured to perform switching functions, e.g. routers, and wired or wireless links. The network hardware 116 may span across a plurality of network domains.

The virtualization layer 130 within the NFVI entity 126 may abstract the hardware resources, i.e., computing hardware 112, storage hardware 114, and network hardware 116 and decouple one or more of the VNF elements 160, 162, and 164 from the underlying hardware. For example, the virtualization layer 130 may be responsible for abstracting and logically partitioning hardware resources, enabling the software that implements the VNF to use the underlying virtualized infrastructure, and providing virtualized resources to the VNF entity. The virtualized resources controlled by the Virtualization Layer 130 may include a virtual computing 110, a virtual storage 118, and a virtual network 120.

FIG. 1 illustrates as system that is configured to transmit a grant request that comprises a first wide area network (WAN) connectivity resource requirement for connecting virtualized network function components (VNFCs) of the virtualized network function (VNF). In some embodiments, the VNF comprises at least two VNFCs placed in different sites. It is understood that any number of sites with any number of VNFCs are contemplated by the present disclosure. The term "site" is intended to refer to a designation of physical location or logical partition that includes discrete elements as described herein.

Figure 2:
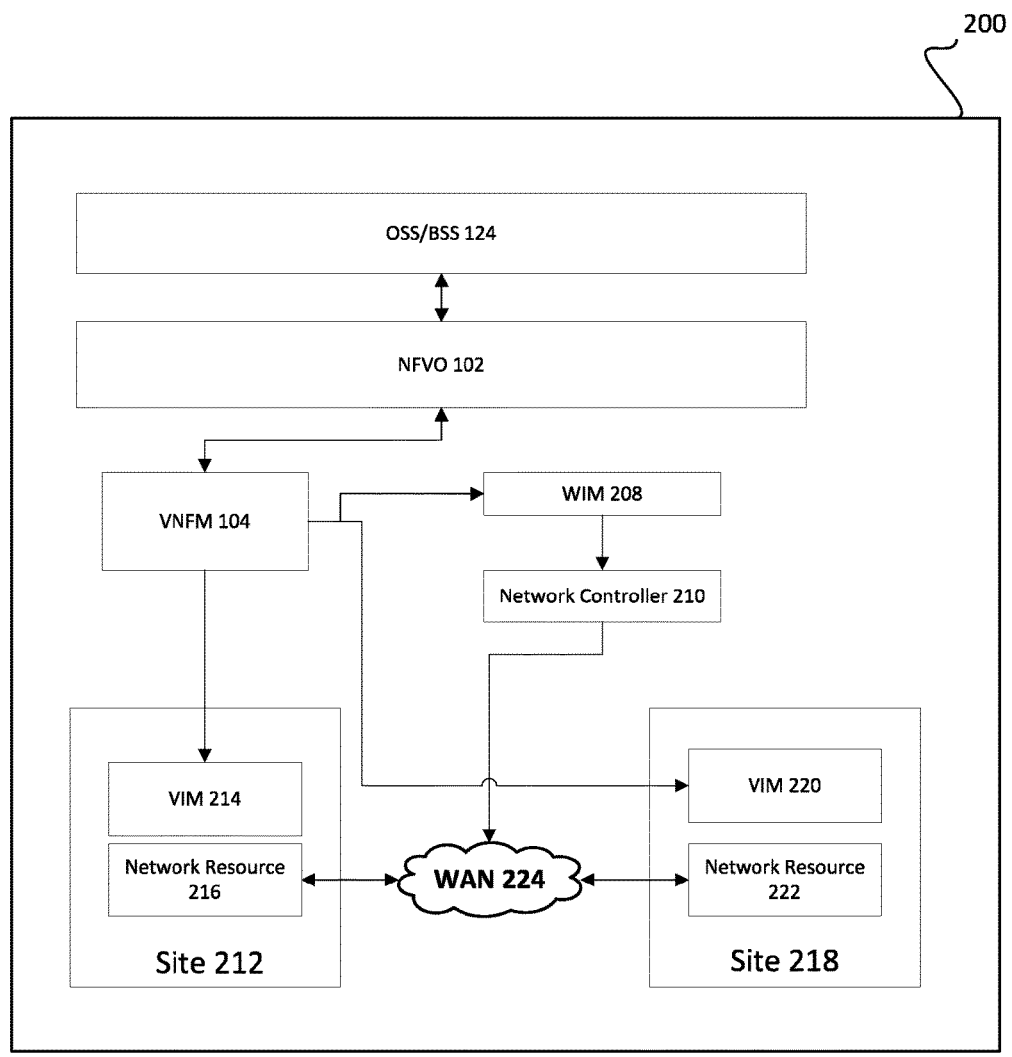
FIG. 2 is a block diagram of an NFV system according to one embodiment of the present disclosure.

FIG. 2 illustrates a schematic diagram of an embodiment of an NFV system for multi-site VNF deployment, which is used to deploy a VNF to multiple sites. Specifically, the NFV system 200 may comprise OSS/BSS 202, NFVO 204, VNFM 206, WIM 208, network controller 210. In addition, FIG. 2 illustrates site 212 comprising VIM 214 and network resource 216 and site 218 comprising VIM 220 and network resource 222. In some embodiments, OSS/BSS 202 supports end to end network service (NS), and on-boards VNFD and NSD to the NFVO, and sends NS LCM requests to NFVO 202.

FIG. 2 illustrates that OSS/BSS 124 is in communication with NFVO 102. NFVO 102 is in communication with virtualized network function manager (VNFM) 104. VNFM 104 is in communication with WIM 208 and site 212 through VIM 214 and site 218 through VIM 220. WIM 208 is in communication with Network Controller 210. Site 212 comprises VIM 214 and Network resource 216, and site 218 comprises VIM 220 and Network resource 222. Network resource 216, network resource 222, and network controller 210 are in communication with WAN 224.

Operations support system and business support system (OSS/BSS) 124 supports end to end network service (NS), and on-boards VNFD and NSD to the NFVO 102, and sends NS LCM requests to NFVO 102.

NFVO 102 may manage the network service (NS) lifecycle and coordinate the management of NS lifecycle, VNF lifecycle (supported by the VNFM entity 104) and NFVI resources (supported by at least one of the VIM 214, 220) to ensure an optimized allocation of the necessary resources. NFVO 102 may communicate with the VNFM 104, to approve or reject grant request initiated by the VNFM 104, and send grant response to VNFM 104. It is understood that NFVO 102 may also be in communication with additional VNFM(s) which are not illustrated in FIG. 2.

The NFVO 102 stores the WAN connectivity information used by each of the constituent VNF instance and/or the constituent nested NS instances belonging to the NS instance it manages. The WAN connectivity information may include any information related to the network connectivity across the WAN including, but not limited to, the identifier of the WAN connectivity, information (such as the address information or the identifier) of the sites connected by the WAN connectivity, the Quality of Service (QoS) information which is attached to the WAN connectivity and be approved by the NFVO (such as WAN connectivity capacity and/or WAN connectivity capacity limit, the bandwidth limit, the jitter and other measure or known network parameters). In addition, the NFVO may also stores the relation between the identifier of the constituent VNF(s) or constituent nested NS instance(s) which consume the WAN connectivity and the identifier of the WAN connectivity. The NFVO permits the grant request from the VNFM for WAN connectivity management in the VNF LCM operation by using the stored information.

VNFM 104 is responsible for life cycle management for one or more VNF instances, such as instantiating, changing the deployment flavor, querying, scaling, modifying, healing and terminating a VNF. The VNFM 104 may communicate with a VNF (not shown in FIG. 2) to complete the LCM for each VNF and to exchange status information of each VNF. In addition, the VNFM may also communicate with the WIM which is typically used to establish WAN connectivity between different VNF components (VNFC) of a VNF instance which are placed in different sites.

WIM 204 manages wide area network (WAN) network resources which may be virtualized network resource allocated (or terminated) at the WIM 204 for establishing (or releasing) WAN connectivity among at least two sites. And the network (WAN) network resources may include allocating WAN network resources for establishing a WAN connectivity, or terminating WAN network resources for releasing a WAN connectivity.

It is understood that, in some embodiments, any information between the VNFM and the WIM may be referred to as part, or all, of the WAN network resource.

WAN network resource may be either identified by a VLAN identifier (by using layer 2 networking technology) or identified by an IP address of the access point to the WAN (by using layer 3 networking technology). Any other implementation of network resource identifier is not excluded as well, as understood by the skilled person. In addition, the WIM communicates with the VNFM to receive network resource management request including network resource allocating request and network resource terminating request from the VNFM, and instructs the network controller to establish or release the WAN connectivity accordingly. It is understood that WIM 208 may be integrated, in some embodiments, into the network controller 210 or the VIM 106.

Network controller 210 communicates with the WIM 208 and receives instructions from the WIM for allocating or terminating WAN network resources, and performs instruction from the WIM.

NFVO 202 may manage the NS lifecycle and coordinates the management of NS lifecycle, VNF lifecycle (supported by the VNFM entity 203) and NFVI resources (supported by the VIM entity 206) to ensure an optimized allocation of the necessary resources. NFVO 202 may communicate with one or more virtualized network function manager (VNFM) 203, to approve or reject grant request initiated by the VNFM, and send grant response to VNFM 203. In addition, the NFVO 202 stores WIM identifier, WAN connectivity information, and a relationship between WAN network resource information and the WAN connectivity information. And the WAN connectivity is used by each of the constituent VNF instance and/or the constituent nested NS instances of the NS instance it manages, or is used by connecting different constituent VNF instances and/or constituent nested NS instances of the same NS instance. And the WAN network resource may corresponds to be consumed by one or more WAN connectivity(ies) using the WAN network resource. The NFVO permits the grant request from the VNFM for WAN connectivity management in the VNF LCM operation by using the stored information.

VNFM 104 is responsible for life cycle management of one or more VNFs, such as instantiating, changing the deployment flavor, querying, scaling, modifying, healing and terminating VNF. VNFM 104 may communicate with the VNF (not shown in FIG. 2) to perform the LCM operation for each VNF and to obtain status information of each VNF. In addition, the VNFM 104 may also communicate with the WIM 208 which is responsible for establishing WAN connectivity among different VNF components (VNFC) of a VNF instance which are placed in different sites.

WIM 208 manages wide area network (WAN) network resources, includes allocating WAN network resources for establishing a WAN connectivity, or terminating WAN network resources for releasing a WAN connectivity. In addition, the WIM 208 communicates with the VNFM 104 to receive network resource management request which may be network resource allocating request or network resource terminating request from the VNFM 104, and instructs the network controller 210 to allocate or terminate WAN network resource accordingly.

Network controller 210 is in communication with the WIM 208 and receives instructions for allocate or terminate WAN network resource from the WIM 208, and performs instruction from the WIM 208.

Figure 3:
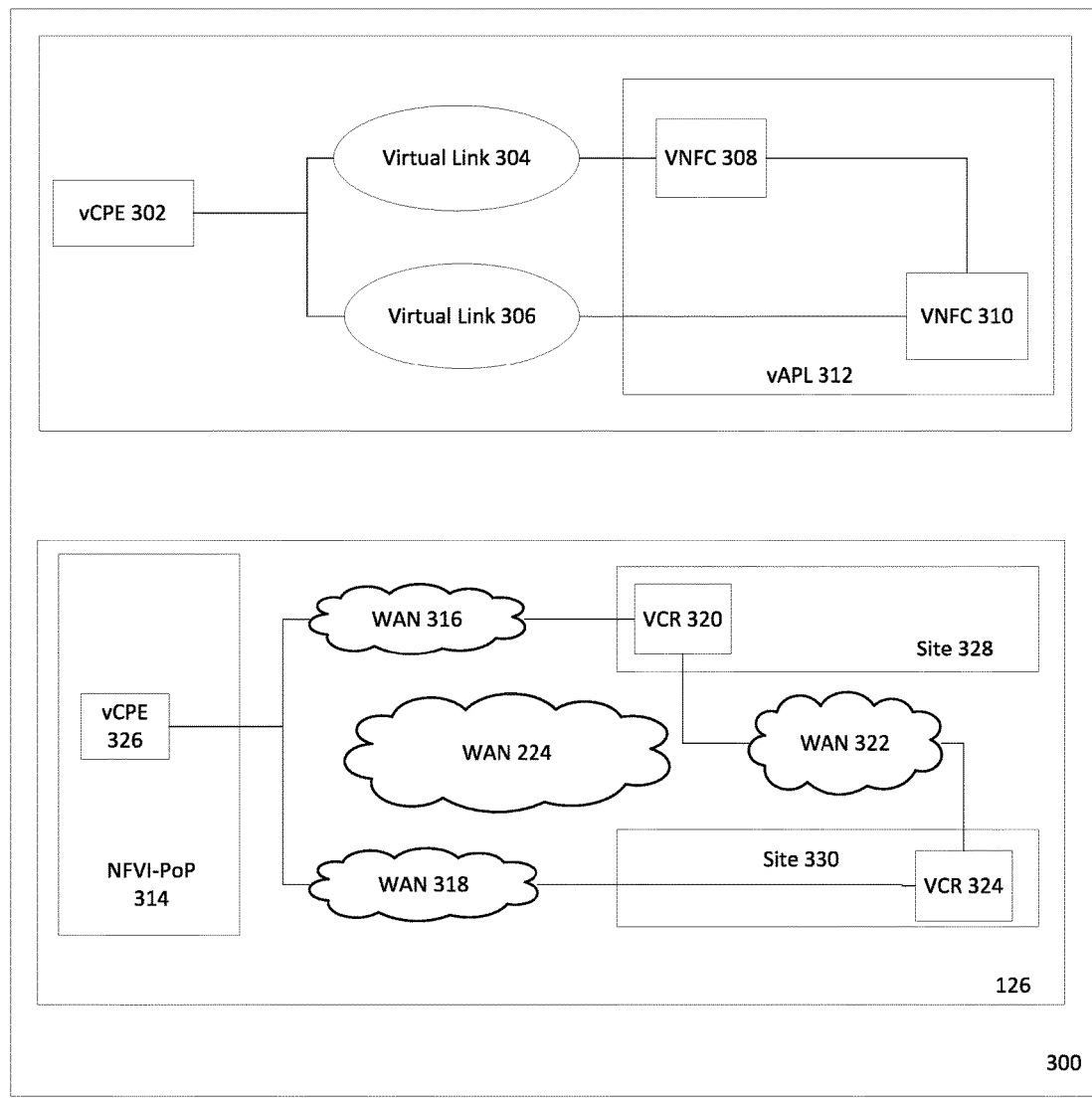
FIG. 3 is a block diagram of an NFV system according to one embodiment of the present disclosure.

FIG. 3 shows an example a system 300 that maps the NS instance to NFVI resources. In this NS instance, two VNF instances are included, and the vAPL 312 comprises VNFC 308 and VNFC 310 as component of the vAPL 312. According to the network service description, the vCPE instance 302 and the vAPL instance 312 may be preferred to be placed into difference sites. During deploying the NS instance, the vCPE instance 302 and the vAPL instance 312 are connected via virtual link 304 and virtual link 306. The virtual link 304 connects the vCPE 302 to the VNFC 308 of the vAPL instance 312, and the virtual link 302 connects the vCPE 302 to the VNFC 310 of the vAPL instance 312. The VNFC 308 connects to the VNFC 310 via an externally managed internal virtual link.

In one embodiment, the VNF description may require high availability. In order to meet the high availability requirements described by the VNF description (VNFD), the vAPL 312 may be distributed to different sites. Referring to the view of NFVI resources, the vCPE 302 and the virtualized compute resource (VCR) 320 (corresponding to VNFC 308) are connected across WAN 316, and the vCPE 326 and the VCR 324 are connected across WAN 318. WAN 322 connects VCR 320 to VCR 324.

Figure 4:
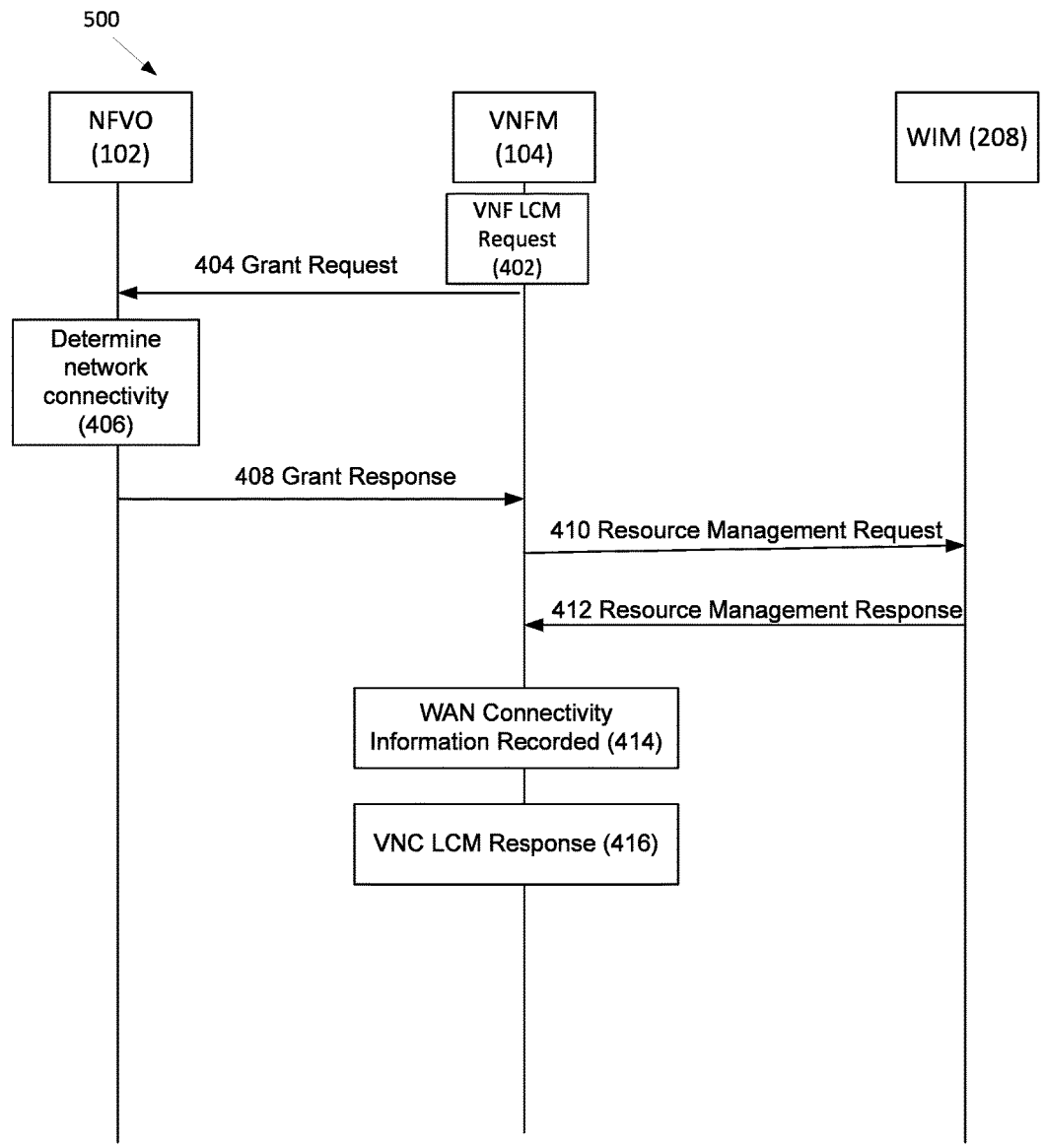
FIG. 4 illustrates a flow diagram of an embodiment of a method for instantiating for a VNF comprising VNFCs which need to be placed in different sites.

FIG. 4 illustrates a flow diagram of an embodiment of a method for instantiating a VNF comprising VNFCs which need to be placed in different sites. It is expressly understood that the embodiment method may be carried out in the context of the NFV system as illustrated in FIG. 2, and may use the NS as an example as illustrated in FIG. 3. In Step 402, the VNFM receives a VNF LCM request from the sender for operating on a VNF instance with a specified LCM operation. The VNF LCM request, in some embodiments, comprises a VNF identifier, and the VNF LCM operation type.

The sender may be the NFVO or the element manager system (EMS). The VNF LCM operation type may be either instantiation, scale, change deployment flavor, modify or heal operation for one or more VNF instances managed by the VNFM. As an example, the VNF LCM request comprises the vAPL instance identifier, and the instantiation as VNF LCM operation type.

Upon receiving the VNF LCM request, the VNFM 104 accesses to the VNFD of the VNF according to the VNF instance identifier in the VNF LCM request, and generates a requested WAN connectivity requirement for connecting the VNFCs across multiple sites according to WAN connectivity requirement description in the VNFD.

The VNFM 104 may comprise placement information for a Virtualized Network Function component (VNFC) of the VNF according to metadata of the VNF described in the VNFD, e.g., determines the placement of the VNFCs to meet the affinity/anti-affinity group and location constraints described in the VNFD. In addition, the VNFM may also determine to place the Virtualized Network Function component (VNFC) of the VNF according to other implementation specific methods.

In addition, the VNF LCM request also comprises quality of service (QoS) requirement for the virtual links connecting the VNFCs, such as bandwidth, latency, jitter or availability. The QoS requirement for the virtual links connecting the VNFCs can optionally be obtained from the VNFD as well. And the VNFM interacts with the VIM for determining the locations (e.g., a combination of site, resource zone and host identifier) for placing the VNFCs based on the QoS information for the virtual links connecting the VNFCs and available network resources fulfilling this QoS requirement.

The set of sites to be connected by WAN connectivity indicates at least two sites, and one or more VNFCs of the VNF instance are deployed in each site. For example, the set of sites in the grant request may be the site 328 for placing the VCR 320 corresponding to VNFC 308, and may be the site 330 for placing the VCR 324 corresponding to VNFC 310.

The requested QoS requirement indicates what QoS are needed for establishing the WAN connectivity which connects the VNFCs of a VNF instance among multiple sites. The QoS may be a QoS parameter in a certain value range, or across a threshold. The QoS parameter may include at least one of throughput, latency (also understood as delay), jitter, for a target WAN connectivity or any other QoS parameter understood by one skilled in the art. In addition, the requested QoS may also comprise bandwidth parameter indication a maximum bitrates and/or guaranteed bitrates of the WAN connectivity. For example, the requested QoS requirement may be that the latency of WAN connectivity between VNFC-A and VNFC-B needs to be less than 10 ms.

The Affinity rule/Anti-Affinity rule is regarding to WAN connectivity. Affinity rule requires two or more WAN connectivity to share a same physical connectivity, e.g., using the same WAN network resource. Anti-affinity rule requires two or more WAN connectivity not to share the same physical connectivity. This two parameters are used in the case that two or more WAN connectivities are requested to be established in the same grant request, e.g., WAN connectivity 322 connects Site 328 and Site 330 while WAN connectivity 316 connects Site 314 and Site 328, and WAN connectivity 318 connects Site 314 and Site 330.

Dependency indicates what sequence of two or more sites to be connected by WAN connectivity. Such as, site 328 for the VCR 320 is connected by WAN connectivity firstly, then Site 330 for the VCR 324 is connected by this WAN connectivity.

In step 404 the VNFM 104 transmits a grant request for a VNF LCM operation to the NFVO 102. The grant request includes the LCM operation type in the VNF LCM request, and the request WAN connectivity requirement for connecting multiple sites that the VNFCs of the VNF instance are placed in.

In one embodiment, the grant request in this procedure may be a grant request for VNF instantiation operation, and includes the instantiation as LCM operation type for the vAPL 312. And requested WAN connectivity requirements may include, a set of site identifiers to be connected across the WAN. In addition, the grant request may also include requested QoS requirements on the WAN connectivity (externally managed internal virtual link), optionally affinity rules and/or anti-affinity rules for the WAN connectivity, and optionally dependency among the sites to be connected by the WAN connectivity.

In step 406, the NFVO determines a WAN connectivity for connecting the sites requested in the grant request. AS part of this determination, the NFVO checks the availability and capacity of WAN network resources, for fulfilling the requested WAN connectivity requirements in the grant request. The NFVO also checks whether the requested WAN connectivity requirement have impact on the NS instance that the multi-site VNF instance belongs to.

With regards to each NS instance which includes the multi-site VNF instance(s) as the constituent, the NFVO 102 stores WIM identifier, WAN connectivity information, and a relationship between WAN network resource information and the WAN connectivity information. The WAN connectivity may be used by the constituent VNF instance and/or the constituent nested NS instances of the NS instance it manages. And the WAN network resource may be shared by one or more WAN connectivity(ies). The WAN connectivity information includes but not be restricted to: the identifier of the constituent VNF or constituent nested NS instance, identifier of the WAN connectivity(ies) used by this constituent, QoS requirements which may include a bandwidth attached to each WAN connectivity, the identifiers of sites connected by the WAN connectivity.

The NFVO determines the WAN connectivity for connecting the sites according to the requested WAN connectivity requirements in the grant request, such as according to the QoS information.

In step 408, the NFVO returns a grant response to the VNFM. The grant response comprises a WIM identifier and a granted WAN connectivity requirement for establishing the WAN connectivity.

Specifically, the granted WAN connectivity requirement describes the granted resource requirement for a WAN connectivity connecting the sites across a WAN. And the granted WAN connectivity requirement may include WAN connectivity identifier, or the access point information by which each site can be accessed to the WAN connectivity. In addition, the granted WAN connectivity requirement may also include the QoS information approved by the NFVO, such as WAN connectivity capacity and/or WAN connectivity capacity limit, the bandwidth limit, the jitter and other network parameters understood by one skilled in the art. In some embodiments, the granted WAN connectivity requirement can be same or different from the requested WAN connectivity requirement. It is understood that the granted QoS requirement may be the same or not the same as the requested QoS requirement. For example, the bandwidth requested by the VNFM is not allowed by the NFVO, and the NFVO just permits a bandwidth less than the requested bandwidth to the WAN connectivity, the other granted QoS parameters may be in the similar situation.

In step 410 the VNFM sends resource management request (a resource allocation request at here) to the WIM 208. The resource management request may be a resource allocation request in this embodiment, and comprises the requested WAN network resource information which is derived from granted WAN connectivity requirement, for requesting the WIM to allocate WAN network resource to the WAN connectivity (e.g., allocate a VLAN identifier for connecting site 328 and site 330 across the WAN for the above example).

In addition, the requested WAN network resource information may comprise the QoS information for the requested WAN network resource which is derived from the granted QoS requirement in the granted WAN connectivity requirement, such as determining a conditional expression of WAN connectivity capacity and/or WAN connectivity capacity limit, the bandwidth limit, the jitter and so on.

In step 412 the WIM 208 returns the resource management response (a resource allocation response at here) to the VNFM 104 after the WIM 208 allocates WAN network resource to the WAN connectivity. Wherein, the resource allocation response comprises the allocated WAN network resource information.

The allocated WAN network resource information includes the identifier of allocated WAN network resource and the information for connecting to the WAN (e.g., IP address and/or VXLAN ID, and/or MPLS-VPN RD, and so on).

After receiving the resource allocation request from the VNFM, the WIM 208 interacts with network controller (not shown in this figure) for creating WAN network resource between provider edge routers with designated bandwidth among Site 328 and Site 330. This interaction is the same as the prior art, it will not be disclosed in detail.

In step 414 the VNFM 104 records relationship between the identifier of the operated VNF instance and the allocated WAN network resource information in the resource allocation response.

In step 416 the VNFM 104 returns the sender a VNF LCM response with the result indicating the success or failure.

Before returning the VNF LCM response to the OSS/BSS, the VNFM configures or re-configures the intra-VNFC virtual links based on information for connecting to the WAN in the resource management response (resource allocation response at here), such as communicate with the VIM to configure the relationship between the designated port of the VNFC and the allocated WAN network resource identifier, and so on.

By including the WAN connectivity requirement for connecting different sites in the grant request, the NFVO may determine the granted WAN connectivity requirement to meet the run-time LCM requirement of the NS instance that the multi-site VNF instance belongs to, therefore the WAN connectivity management inside the VNF instance is guaranteed to be consistent to those WAN connectivities managed in the NS instance that the VNF instance belongs to. In addition, as the VNFM knows the information about the VNFCs of the VNF instance according to the VNFD, the WAN connectivity requirement for the VNFCs may meet the requirement of the VNF instance, so that the VNF LCM operation which includes the WAN connectivity management for connecting the VNFCs across multiple sites can be performed in a consistent way initiated by the same source (the VNFM).

Figure 5:
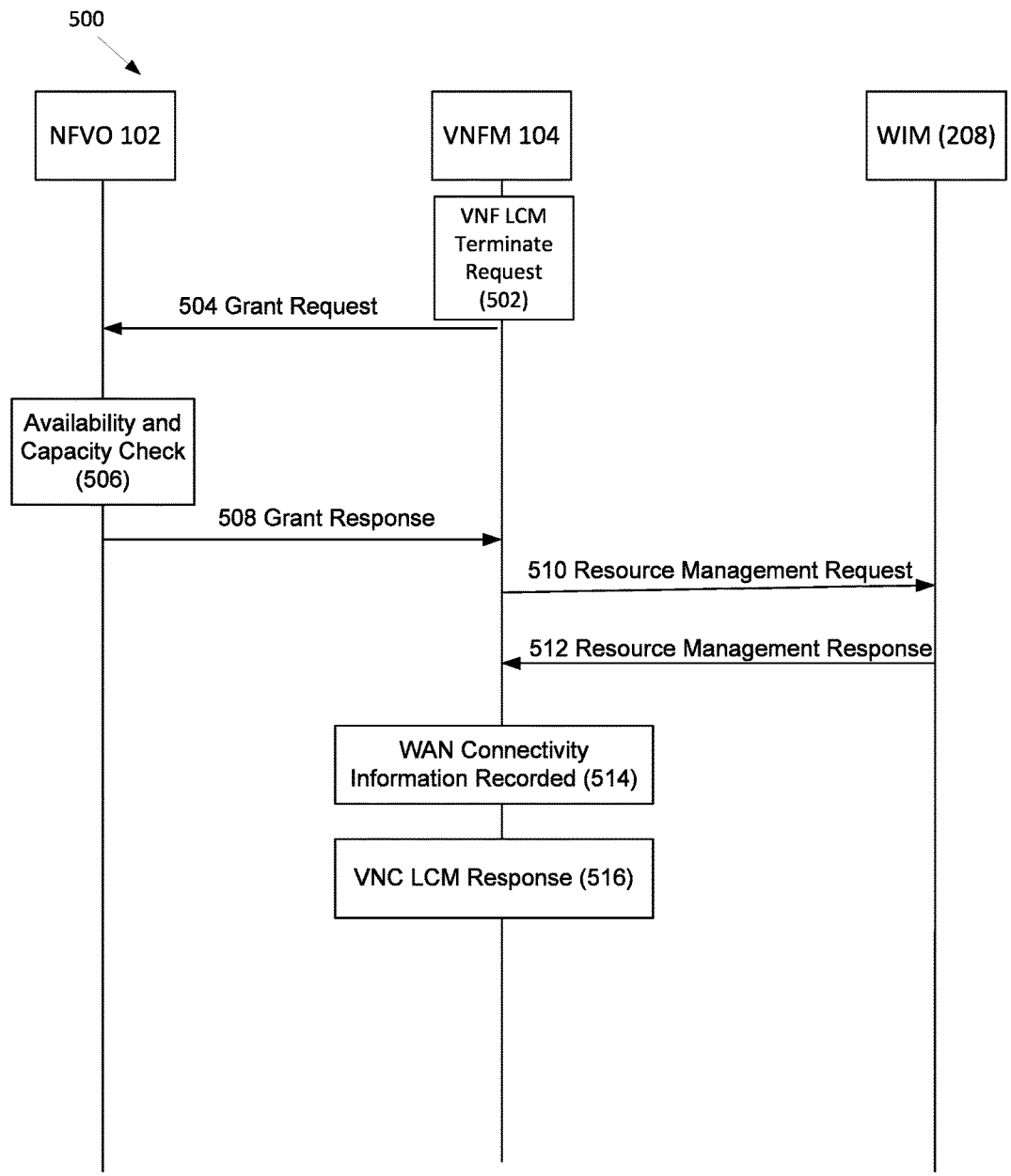
FIG. 5 illustrates a flow diagram of an embodiment of a method for releasing a WAN connectivity connecting the VNFCs of the VNF instance placed in different sites.

FIG. 5 illustrates a flow diagram 500 of an embodiment of a method for releasing a WAN connectivity connecting the VNFCs of the VNF instance placed in different sites. It is expressly understood that this may be carried out in the context of the NFV system as illustrated in any of the figures disclosed herein.

In step 502 the VNFM 104 receives a VNF LCM request from a sender, for terminating or modifying a VNF instance. Wherein, the VNF LCM request comprises a VNF instance identifier, an VNF LCM operation type.

In some embodiments, the VNF LCM request comprises the vAPL instance identifier, and termination or modification as VNF LCM operation type.

After receiving the VNF LCM request, the VNFM 104 accesses to the allocated WAN network resource information stored in the VNFM 104 by using the VNF instance identifier in the VNF LCM request for terminating or modifying a VNF instance. For example, by accessing the VNFD identified by the VNF instance identifier, the VNFM 104 determines that the VNF instance includes VCR 320 and VCR 324, and a VLAN in WIM 208 connects the VCR 320 located in sites 328 and VCR 324 located in site 324.

In step 504 the VNFM 104 sends a grant request for a VNF LCM operation to the NFVO 102. The grant request includes the LCM operation type and WAN connectivity identifier. In step 506 the NFVO 102 checks whether the release of WAN connectivity impacts on the NS instance that the multi-site VNF instance belongs to. In some embodiments, the NFVO 102 determines whether the WAN connectivity to be released is shared by other constituents of the NS instance, if the release of WAN connectivity does not impact on the NS instance, and the NFVO 102 approves the grant request for the VNF LCM operation to terminate or modify the VNF instance. Otherwise, the NFVO 102 rejects the grant request. In this embodiment, it assumes that the WAN connectivity to be released does not impact the NS instance, and approve the grant request for termination or modifying the VNF instance. In step 508 the NFVO 102 returns a Grant response to the VNFM, with the result indicating the success.

In step 510 the VNFM 104 sends a resource management request (a resource termination request at here) to the WIM 208. The resource management request may be a resource termination request including the WAN network resource identifier.

The VNFM 104 obtains the WIM identifier based on its stored the allocated WAN network resource information (for example the recorded information in step 414). The WIM 208 manages the WAN network resource to connect the different sites in which the VNFCs are placed. Then the VNFM 104 sends the resource termination request to the WIM 208 for terminating corresponding WAN network resources allocated to the WAN connectivity. It is understood that in some embodiments, the resource terminating request comprises the WAN network resource identifier. In step 512 the WIM 208 interacts with the Network Controller 210, for deleting the network connectivity between provider edge routers in Site 328 and Site 330. The WIM 208 returns the resource termination response to the VNFM 104, with the result indicating the releasing and terminating the WAN connectivity is success or failure.

In step 514 the VNFM deletes the relationship between the identifier of the operated VNF instance and the allocated WAN network resource information in the resource allocation response, and in step 518 the VNFM 104 returns the Sender a VNF LCM response with the result indicating the success or failure.

According to the above procedure of the embodiment, the VNFM 104 may initiate to release the WAN connectivity of the VNF instance after receiving a terminating or modifying a VNF instance. It may be desirable, in some embodiments, to avoid the NFVO 102 managing the WAN connectivity in a separate procedure or by operator's operation. In addition, the network connectivity is deleted once the VNF LCM request is received and be approved by the NFVO 102, therefore the network resource is save, and the management for the network resource is more efficiency.

Figure 6:
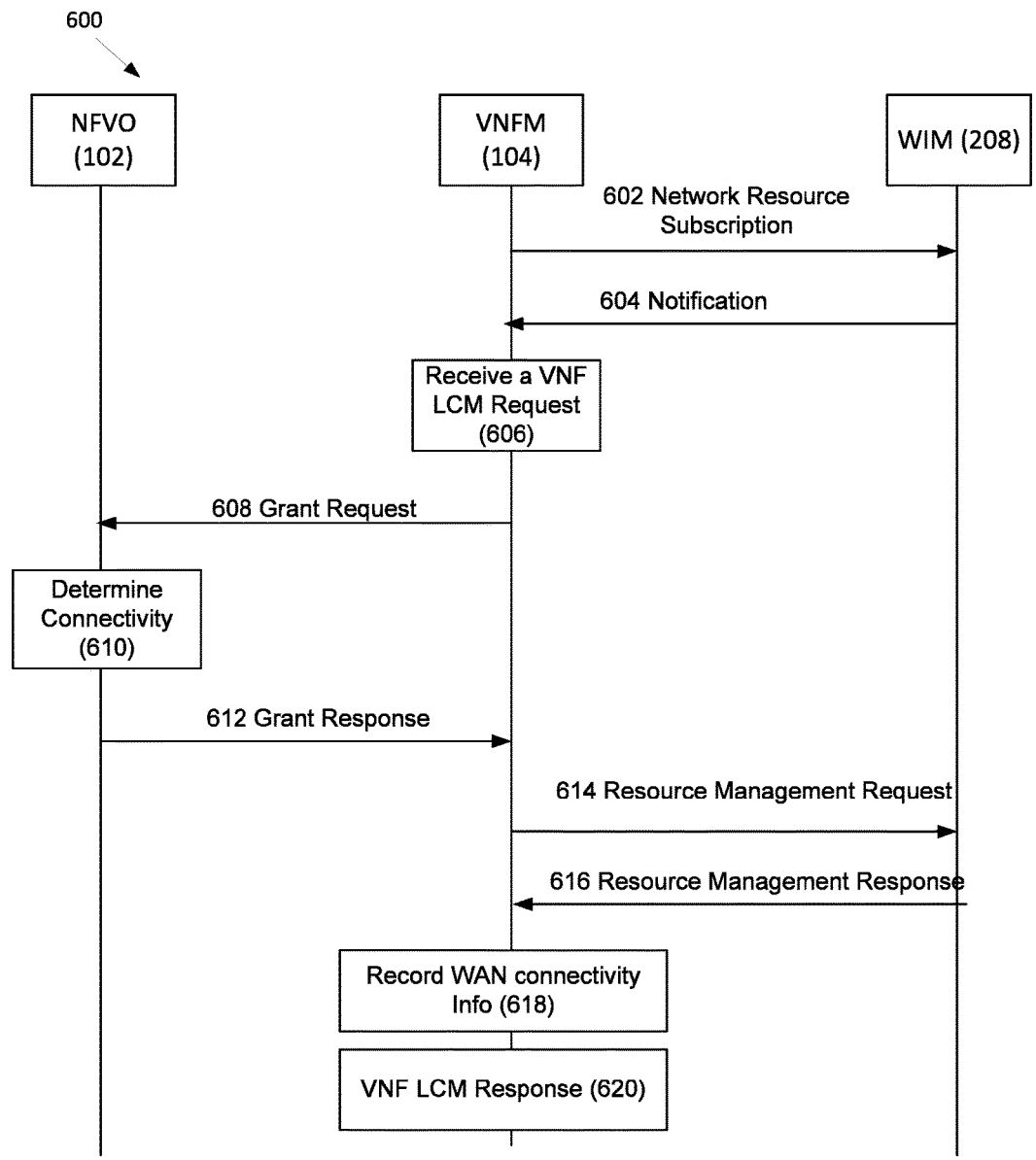
FIG. 6 illustrates a flow diagram of an another embodiment of a method for granting for WAN resource management of multi-site VNF deployment.

FIG. 6 illustrates a flow diagram of an embodiment of a method for granting for WAN resource management of multi-site VNF deployment. In step 602, the VNFM subscribe WAN network resource information from a WIM 208 for obtaining available WAN network resource.

The VNFM may subscribe WAN network resource information from all the WIM 208 according to the allocated WAN network resource information stored in the VNFM 104 according to the WIM 208 identifier. In step 604, the WIM 208 sends (actually in the Push mode) a notification comprising the WAN network resource information to the VNFM, when the network resource is available.

The WAN network resource information may comprise the available WAN network resource managed by the WIM 208. In addition, the WAN network resource information may also comprise the site identifier connected by network resource, and the QoS information, and so on. In step 606, the VNFM 104 receives a VNF LCM request from a sender, for operating on a VNF instance with a specified LCM operation. Wherein, the VNF LCM request comprises a VNF instance identifier, and the VNF LCM operation type.

The sender may be either the NFVO 102 or the EMS. The VNF LCM operation may be either instantiation, scale, change deployment flavour, modify or heal operation for one or more VNF instances managed by the VNFM 104. As an example at here, the VNF LCM request comprises the vAPL instance identifier, and the instantiation as VNF LCM operation type for the vAPL instance.

Elements of this are substantially similar to step 402. Upon receiving the VNF LCM request, the VNFM 104 accesses the VNFD according to the VNF instance identifier, generates a requested WAN connectivity requirement for connecting the VNFCs across multiple sites according to in the VNFD. And then, the VNFM 104 may determine a WAN network resource identifier from the WAN resource information sent by the WIM (which may correspond to the information described above in step 604) according to the requested WAN connectivity requirement to meet the requested WAN connectivity requirement. In some embodiments, information between the NFVO and the VNFM is referred to as WAN network connectivity.

The details for generating requested WAN connectivity requirement may refer to the description in step 402, and will not described in detail.

In step 608 VNFM 104 transmits a grant request for a VNF LCM operation to the NFVO. The grant request includes the LCM operation type in the VNF LCM request, the WAN network resource identifier determined by the VNFM in step 606 and/or a request WAN connectivity requirement for connecting multiple sites that the VNFCs of the VNF instance are placed in. In some embodiments, the grant request may be an instantiation grant request. And the LCM operation type and the requested WAN connectivity requirement may refer to the description in step 404.

In step 610 after receiving the grant request, the NFVO 102 determines a WAN connectivity for connecting the sites requested in the grant request.

Specifically, before determining a WAN connectivity, the NFVO 102 checks whether the WAN network resources affects the NS instance that the multi-site VNF instance belongs to. The NFVO 102 checks whether the WAN network resource has just been used by other constituents of the NS instance, or the establishment of the WAN connectivity has the dependency on the establishment of other constituents of the NS instance, if yes, the NFVO 102 will reject the Grant request. Otherwise, the NFVO 102 will approve the request for using the VNFM 104 proposed WAN connectivity.

The NFVO 102 may determine a network connectivity, such as a virtual local area networks (VLAN), for connecting the sites according to the requested WAN connectivity requirements and the stored relationship between WAN network resource information and WAN connectivity information.

In step 612 the NFVO returns the VNFM a grant response. The grant response may refer to the grant response previously described in step 408.

In step 614 the VNFM sends resource management request (a resource allocation request at here) to the WIM 208. The resource management request may be a resource allocation request in this embodiment, and comprises requested WAN network resource information which is derived from granted WAN connectivity requirement, for requesting the WIM to allocate WAN network resource to the WAN connectivity (e.g., allocate a VLAN identifier for connecting site 328 and site 330 across the WAN the above example).

In addition, the requested WAN network resource information may comprise the QoS information for the requested WAN network resource which is derived from the granted QoS requirement in the granted WAN connectivity requirement, such as determining a conditional expression of WAN connectivity capacity and/or WAN connectivity capacity limit, the bandwidth limit, the jitter and so on.

In step 616 the WIM 208 returns the resource management response (a resource allocation response at here) to the VNFM 104 after the WIM 208 allocates WAN network resource to the WAN connectivity. Wherein, the resource allocation response comprises the allocated WAN network resource information.

The allocated WAN network resource information includes the identifier of allocated WAN network resource and the information for connecting to the WAN (e.g., IP address and/or VXLAN ID, and/or MPLS-VPN RD, and so on).

After receiving the resource allocation request from the VNFM, the WIM 208 interacts with network controller (not shown in this figure) for creating WAN network resource between provider edge routers with designated bandwidth among Site 328 and Site 330. This interacting with and the creating is the same as the prior art, it will not be disclosed in detail.

In step 618 the VNFM 104 records relationship between the identifier of the operated VNF instance and the allocated WAN network resource information in the resource allocation response.

In step 620 the VNFM 104 returns the sender a VNF LCM response with the result indicating the success or failure.

According to this embodiment of the invention, the VNFM may subscribe the WAN network resource information, and determine a WAN network resource ID after receiving the VNF LCM request. Therefore, the WAN connectivity management inside the VNF instance is guaranteed to be consistent to those WAN connectivities managed in the NS instance that the VNF instance belongs to. In addition, as the VNFM knows the information about the VNFCs of the VNF instance according to the VNFD, the WAN connectivity requirement for the VNFCs may meet the requirement of the VNF instance, so that the VNF LCM operation which includes the WAN connectivity management for connecting the VNFCs across multiple sites can be performed in a consistent way initiated by the same source (the VNFM).

Figure 7:
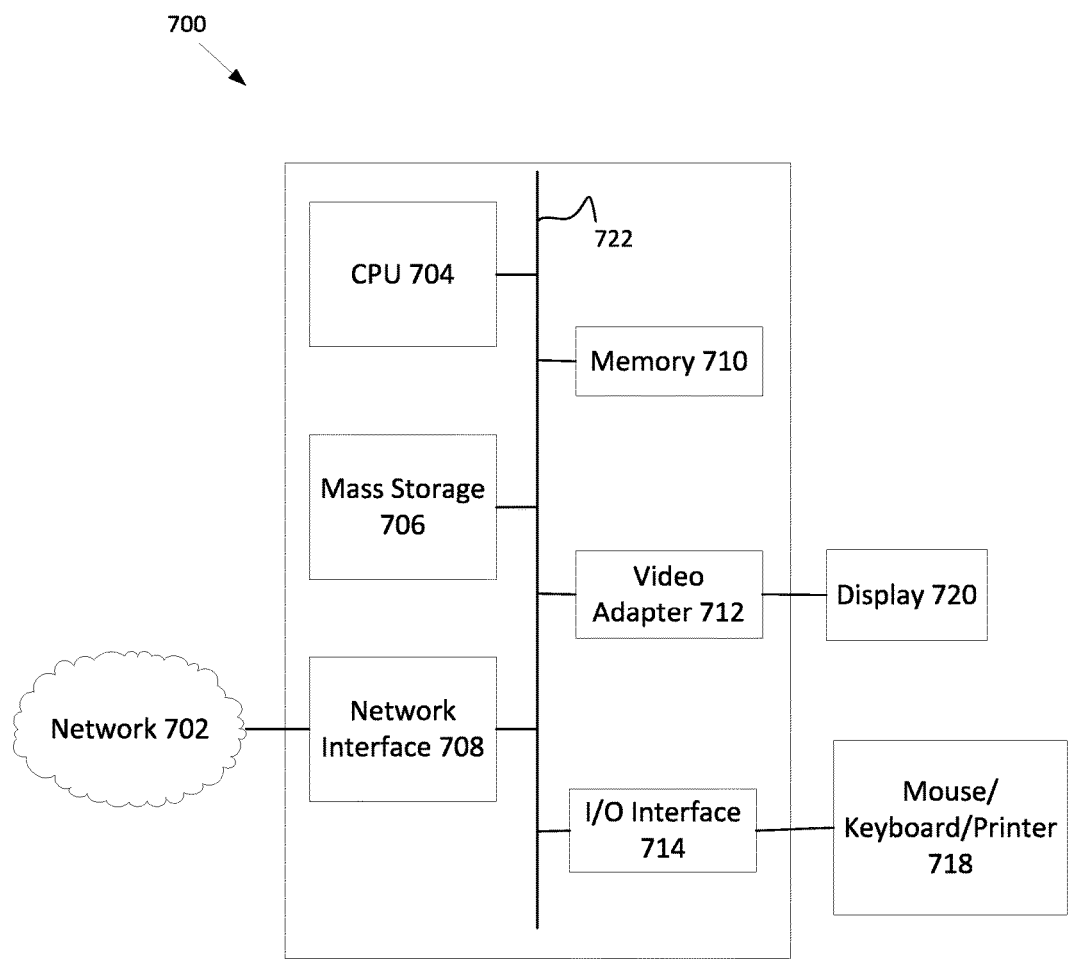
FIG. 7 illustrates a block diagram of an embodiment processing system for performing the methods described herein.

FIG. 7 illustrates a block diagram of a processing system 700 that may be used for implementing the methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 700 may comprise a processing unit equipped with one or more input/output devices, such as a speaker, microphone, mouse, touch screen, keypad, keyboard, printer 718, a display 720, and the like. The processing unit may include a central processing unit (CPU) 704, memory 710, a mass storage device 706, a video adapter 712, and an I/O interface 714 connected to a bus 722.

The bus 722 may be one or more of any type of several bus architectures including a memory bus or memory controller, a peripheral bus, video bus, or the like. The CPU 704 may comprise any type of electronic data processor. The memory 710 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 710 may include ROM for use at boot-up, and DRAM for program and data storage for use while executing programs.

The mass storage device 706 may comprise any type of non-transitory storage device configured to store data, programs, and other information and to make the data, programs, and other information accessible via the bus 722. The mass storage device 706 may comprise, for example, one or more of a solid state drive, hard disk drive, a magnetic disk drive, an optical disk drive, or the like.

The video adapter 712 and the I/O interface 714 provide interfaces to couple external input and output devices to the processing unit. As illustrated, examples of input and output devices include the display 820 coupled to the video adapter 712 and the mouse/keyboard/printer 718 coupled to the I/O interface 714. Other devices may be coupled to the processing unit, and additional or fewer interface devices may be utilized. For example, a serial interface such as Universal Serial Bus (USB) (not shown) may be used to provide an interface for a printer.

The processing system 700 also includes one or more network interfaces 708, which may comprise wired links, such as an Ethernet cable or the like, and/or wireless links to access nodes or different networks 702. The network interface 708 allows the processing system 700 to communicate with remote units via the network(s) 702. For example, the network interface 708 may provide wireless communication via one or more transmitters/transmit antennas and one or more receivers/receive antennas. In an embodiment, the processing system 700 is coupled to a local-area network or a wide-area network 702 for data processing and communications with remote devices, such as other processing units, the Internet, remote storage facilities, or the like.

Figure 8:
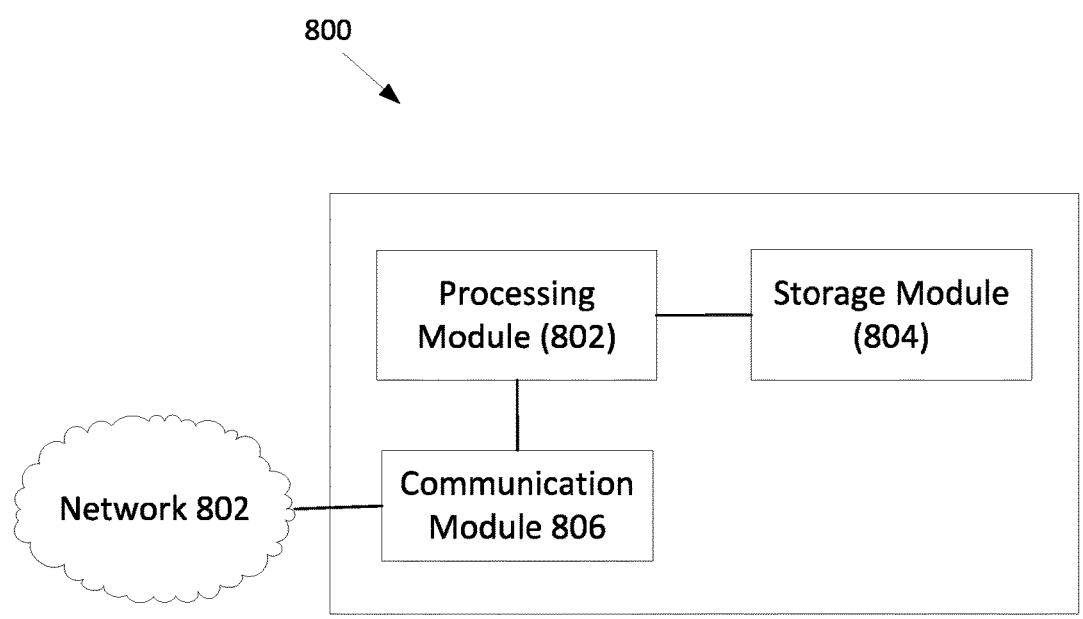
FIG. 8 illustrates a block diagram of modules in a processing system for performing the methods described herein.

FIG. 8 is a block diagram illustrating modules which may be used to implement various features of the disclosure, including VNFM 104. In this figure, a processing module 802 is coupled to a storage module 804 and a communication module 806. The processing module 802 capable of performing information processing including the reception, interpretation, modification, and creation of data as required by the VNFM described and disclosed herein. The storage module 804 may be used to store, retrieve, and hold data as described herein, including mapping data as may be required to carry out the various embodiments disclosed herein. The communication module 806 may be used to communication with network 802 including various other elements described in this disclosure. Each of the modules may be instantiated in hardware or software, and each module is capable of performing the various functions as required by the disclosure above. It is further understood that other elements described in this specification may be comprised of the modules described in FIG. 8 including, but not limited to, the NFVO 102 and WIM 208.

For example, in one embodiment a virtualized network function life cycle management system is disclosed that comprises a communication module 804 that sends a grant request for a VNF LCM operation to a network functions virtualization orchestrator (NFVO). The grant request comprises a requested Wide Area Network (WAN) connectivity requirement for connecting multiple sites that virtualized network function components (VNFCs) of the virtualized network Function (VNF) instance are placed in, and the VNF to be operated comprises at least two VNFCs placed in different sites. This communication module 804 also receives a grant response from the network functions virtualization orchestrator (NFVO). The grant response comprises WAN Infrastructure Manager (WIM) identifier and a granted WAN connectivity requirement approved by the NFVO which may be processed by the processing module 802. The granted WAN connectivity requirement describes a granted requirement for managing a WAN connectivity connecting the sites across a WAN and may be stored in the storage module 804. In this embodiment the communication module 804 may send a resource allocation request to the WIM according to the WIM identifier, wherein the resource allocation request comprises requested WAN network resource information derived from granted WAN connectivity information.

In another embodiment related to a NFVO implemented in the modules described by FIG. 8, a virtualized network function life cycle management system is disclosed that includes receiving, by the communications module 806 of a network functions virtualization orchestrator (NFVO) a grant request for a VNF LCM operation from a virtualized network function manager (VNFM). The grant request comprises a requested Wide Area Network (WAN) connectivity requirement for connecting multiple sites that virtualized network function components (VNFCs) of the virtualized network Function (VNF) instance are placed in, and the VNF to be operated comprises at least two VNFCs placed in different sites. The processing module 802 determines a WAN connectivity for connecting the multiple sites across the WAN according to the requested WAN connectivity requirements stored in the storage module 804. The communications module 806 returns a grant response to the VNFM; wherein, the grant response comprises a WIM identifier and a granted WAN connectivity requirement approved by the NFVO, wherein, the granted WAN connectivity requirement describes a granted requirement for managing a WAN connectivity connecting the sites across a WAN.

Figure 9:
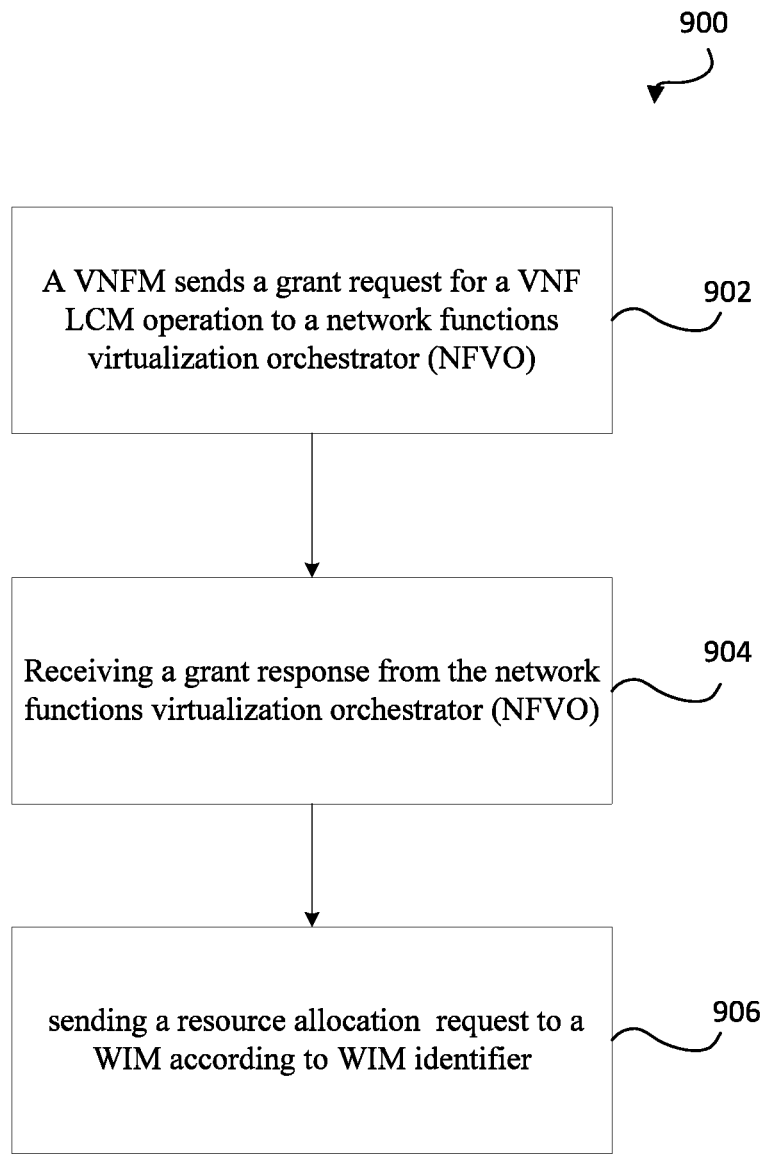
FIG. 9 illustrates a flowchart of one embodiment the operation of a VNFM, according to one embodiment of the present disclosure.

FIG. 9 is a flowchart 900 illustrating one method disclosed herein. In block 902, a VNFM sends a grant request for a VNF LCM operation to a network functions virtualization orchestrator (NFVO). In block 904, the VNFM receives a grant response from the network functions virtualization orchestrator (NFVO). In block 906, the VNFM sends a resource allocation request to a WIM according to WIM identifier.

Figure 10:
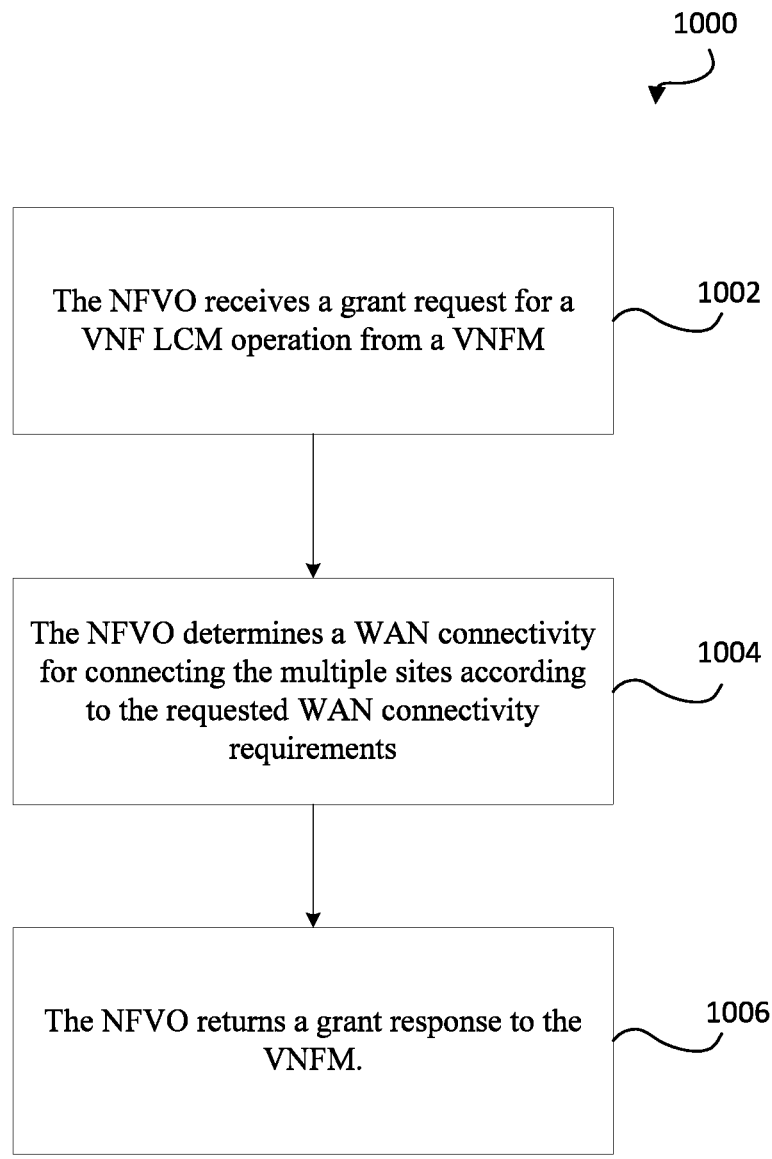
FIG. 10 illustrates a flowchart of one embodiment the operation of a NFVO, according to one embodiment of the present disclosure.

FIG. 10 is a flowchart 1000 that illustrates one method of operating a NFVO. In block 1002 the NFVO receives a grant request for a VNF LCM operation from a VNFM. In block 1004 the NFVO determines a WAN connectivity for connecting the multiple sites according to the requested WAN connectivity requirements. In block 1006, the NFVO returns a grant response to the VNFM, and, the grant response comprises a WIM identifier and a granted WAN connectivity requirement approved by the NFVO, and the granted WAN connectivity requirement describes a granted requirement for managing a WAN connectivity connecting the sites across a WAN.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Additional aspects of the embodiments of the are illustrated the following examples:

Example 1

A virtualized network function (VNF) life cycle management (LCM) method comprising:

sending, by a virtualized network function manager (VNFM), a grant request for a VNF LCM operation to a network functions virtualization orchestrator (NFVO), wherein the grant request comprises a wide area network (WAN) connectivity requirement for connecting multiple sites that virtualized network function components (VNFCs) of the virtualized network function (VNF) instance are placed in, and the VNF to be operated comprises at least two VNFCs placed in different sites;

receiving, by the VNFM, a grant response from the network functions virtualization orchestrator (NFVO), wherein the grant response comprises WAN infrastructure manager (WIM) identifier and a granted WAN connectivity requirement approved by the NFVO, wherein, the granted WAN connectivity requirement describes a granted requirement for managing a WAN connectivity connecting the multiple sites across a WAN; and sending, by the VNFM, a resource allocation request to the WIM according to the WIM identifier, wherein the resource allocation request comprises requested WAN network resource information derived from the granted WAN connectivity requirement.

Example 2

The method according to Example 1, the requested WAN connectivity requirement is different from the granted WAN connectivity requirement.

Example 3

The method according to Example 1 or 2, the method further comprising:
receiving, by the VNFM, a VNF LCM request, wherein the VNF LCM request comprises a VNF instance identifier;
accessing, by the VNFM, the virtualized network function description (VNFD) according to the VNF instance identifier; and
generating, by the VNFM, the requested WAN connectivity requirement for connecting the VNFCs according to the VNFD.

Example 4

The method according to any one of Example 1 to 3, wherein:
the requested WAN connectivity requirement comprises at least one of: a set of site identifiers to be connected across the WAN, or the requested QoS requirement on the WAN connectivity.

Example 5

The method according to any one of Example 1 to 4, the method further comprising:
receiving, by the VNFM, a resource allocation response from the WIM, wherein the resource allocation response comprises allocated WAN network resource information.

Example 6

The method according to any one of Example 1 to 5, the method further comprising:
recording, by the VNFM, the relationship between the identifier of the operated VNF instance and the allocated WAN network resource information in the resource allocation response.

Example 7

The method according to any one of Example 1 to 6, before sending the grant request to the NFVO, the method further comprises:
subscribing to WAN network resource information from the WIM;
receiving a notification comprising the WAN network resource information, wherein the WAN network resource information comprises information of available WAN network resource managed by the WIM.

Example 8

The method according to any one of Example 1 to 7, before sending the grant request to the NFVO, the method further comprises:

determining, by the VNFM, a WAN network resource identifier from the WAN network resource information to meet the requested WAN connectivity requirement;
wherein, the grant request comprises a requested WAN connectivity requirement and/or the WAN network resource identifier determined by the VNFM.

Example 9

A virtualized network function (VNF) life cycle management (LCM) method comprising:
receiving, by network functions virtualization orchestrator (NFVO), a grant request for a VNF LCM operation from a virtualized network function manager (VNFM), wherein the grant request comprises a requested wide area network (WAN) connectivity requirement for connecting multiple sites that virtualized network function components (VNFCs) of the virtualized network Function (VNF) instance are placed in, and the VNF to be operated comprises at least two VNFCs placed in different sites;
determining, by the NFVO, a WAN connectivity for connecting the multiple sites across a WAN according to the requested WAN connectivity requirements;
returning, by the NFVO, a grant response to the VNFM;
wherein, the grant response comprises a WIM identifier and a granted WAN connectivity requirement approved by the NFVO, wherein, the granted WAN connectivity requirement describes a granted requirement for managing the WAN connectivity connecting the multiple sites across the WAN.

Example 10

The method according to Example 9, wherein the determining the WAN connectivity for connecting multiple sites according to the requested WAN connectivity requirements comprises:
determining, by the NFVO, the WAN network resource information for connecting the sites according to the requested WAN connectivity requirements.

Example 11

The method according to any one of Example 10 and 9, wherein the grant request further comprises the WAN network resource identifier determined by the VNFM; and the method further comprises:
determining, by the NFVO, the WAN connectivity for connecting the multiple sites according to the stored relationship between WAN network resource information comprising the WAN network resource identifier and WAN connectivity information.

Example 12

A virtualized network function manager (VNFM), comprising:
a processor that generates a grant request for a virtualized network function (VNF) life cycle management (LCM) operation, wherein the grant request comprises a requested wide area network (WAN) connectivity requirement for connecting multiple sites that virtualized network function components (VNFCs) of the virtualized network function (VNF) instance are placed in, and the VNF to be operated comprises at least two VNFCs placed in different sites; and
a network interface that sends the grant request to a network functions virtualization orchestrator (NFVO) and receives a grant response from the NFVO, wherein the grant response comprises WAN infrastructure manager (WIM) identifier and a granted WAN connectivity requirement approved by the NFVO, wherein, the granted WAN connectivity requirement describes a granted resource requirement for managing a WAN connectivity connecting the multiple sites across a WAN, wherein the network interface further sends a resource allocation request to the WIM according to the WIM identifier, wherein the resource allocation request comprises the requested WAN network resource information derived from the granted WAN connectivity requirement.

Example 13

The VNFM of Example 12, the requested WAN connectivity requirement is same as or different from the granted WAN connectivity requirement.

Example 14

The VNFM of Example 12 or 13, wherein the processor, before sending the grant request to the NFVO, receives, a VNF LCM request that comprises a VNF instance identifier, accessing to the VNF description (VNFD) according to the VNF instance identifier, and generates the requested WAN connectivity requirement for connecting the VNFCs according to the VNFD.

Example 15

The VNFM of any one of Examples 12 to 14, wherein: the requested WAN connectivity requirement comprises at least one of: a set of site identifiers to be connected across the WAN, and the requested QoS requirement on the WAN connectivity.

Example 16

The VNFM of any one of Examples 12 to 15, wherein the processor receives a resource allocation response from the WIM, wherein the resource allocation response allocated WAN network resource information.

Example 17

The VNFM of any one of Examples 12 to 16, wherein the processor further records the relationship between the identifier of the operated VNF instance and the allocated WAN network resource information in the resource allocation response.

Example 18

The VNFM of any one of Examples 12 to 17, wherein before the network interface sends the grant request to the NFVO, the VNFM subscribes to WAN network resource information from the WIM and receives a notification comprising the WAN network resource information, wherein the WAN network resource information comprises information of available WAN network resource managed by the WIM.

Example 19

The VNFM of any one of Examples 12 to 18, wherein before the network interface sends the grant request to the NFVO, the VNFM further determines a WAN network resource identifier from the WAN resource information to meet the requested WAN connectivity requirement, wherein, the grant request comprises a requested Wide Area Network (WAN) connectivity requirement and/or the WAN network resource identifier determined by the VNFM.

Example 20

A network functions virtualization orchestrator (NFVO), comprising:
a network interface that receives a grant request for a virtualized network function (VNF) life cycle management (LCM) operation from a virtualized network function manager (VNFM), wherein grant request comprises a requested wide area network (WAN) connectivity requirement for connecting multiple sites that virtualized network function components (VNFCs) of the virtualized network Function (VNF) are place in, and the VNF to be operated comprises at least two VNFCs placed in different sites;
a processor that determines a WAN connectivity for connecting the multiple sites across a WAN according to the requested WAN connectivity requirements, wherein the network interface further returns a grant response to the VNFM; wherein, the grant response comprises a WIM identifier and a granted WAN connectivity requirement approved by the NFVO, wherein, the granted WAN connectivity requirement describes a granted requirement for managing the WAN connectivity connecting the multiple sites across the WAN.

Example 21

The NFVO according to Example 20, wherein the processor determines the WAN network resource information for connecting the multiple sites according to the requested WAN connectivity requirements.

Example 22

The NFVO according to Examples 20 or 21, wherein the grant request comprises a requested Wide Area Network (WAN) connectivity requirement and/or the WAN network resource identifier determined by the VNFM.

Example 23

The NFVO of any one of Examples 20 to 22, wherein the processor further determines the WAN connectivity for connecting the multiple sites according to the stored relationship between WAN network resource information.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A virtualized network function (VNF) life cycle management (LCM) method comprising:
sending, by a virtualized network function manager (VNFM), a grant request for a VNF LCM operation to a network functions virtualization orchestrator (NFVO), wherein the grant request comprises a wide area network (WAN) connectivity requirement for connecting multiple sites that virtualized network function components (VNFCs) of the virtualized network func- tion (VNF) instance are placed in, and the VNF to be operated comprises at least two VNFCs placed in different sites;

receiving, by the VNFM, a grant response from the network functions virtualization orchestrator (NFVO), wherein the grant response comprises WAN infrastructure manager (WIM) identifier and a granted WAN connectivity requirement approved by the NFVO, wherein, the granted WAN connectivity requirement describes a granted requirement for managing a WAN connectivity connecting the multiple sites across a WAN; and sending, by the VNFM, a resource allocation request to the WIM according to the WIM identifier, wherein the resource allocation request comprises requested WAN network resource information derived from the granted WAN connectivity requirement.

2. The method according to claim 1, the requested WAN connectivity requirement is different from the granted WAN connectivity requirement.

3. The method according to claim 1, the method further comprising:

receiving, by the VNFM, a VNF LCM request, wherein the VNF LCM request comprises a VNF instance identifier;

accessing, by the VNFM, the virtualized network function description (VNFD) according to the VNF instance identifier; and generating, by the VNFM, the requested WAN connectivity requirement for connecting the VNFCs according to the VNFD.

4. The method according to claim 3, wherein:

the requested WAN connectivity requirement comprises at least one of: a set of site identifiers to be connected across the WAN, or the requested QoS requirement on the WAN connectivity.

5. The method according to claim 1, the method further comprising:

receiving, by the VNFM, a resource allocation response from the WIM, wherein the resource allocation response comprises allocated WAN network resource information.

6. The method according to claim 5, the method further comprising:

recording, by the VNFM, the relationship between the identifier of the operated VNF instance and the allocated WAN network resource information in the resource allocation response.

7. The method according to claim 1, before sending the grant request to the NFVO, the method further comprises:

subscribing to WAN network resource information from the WIM;

receiving a notification comprising the WAN network resource information, wherein the WAN network resource information comprises information of available WAN network resource managed by the WIM.

8. The method according to claim 7, before sending the grant request to the NFVO, the method further comprises:

determining, by the VNFM, a WAN network resource identifier from the WAN network resource information to meet the requested WAN connectivity requirement;

wherein, the grant request comprises a requested WAN connectivity requirement and/or the WAN network resource identifier determined by the VNFM.

9. A virtualized network function (VNF) life cycle management (LCM) method comprising:

receiving, by network functions virtualization orchestrator (NFVO), a grant request for a VNF LCM operation from a virtualized network function manager (VNFM), wherein the grant request comprises a requested wide area network (WAN) connectivity requirement for connecting multiple sites that virtualized network function components (VNFCs) of the virtualized network function (VNF) instance are placed in, and the VNF to be operated comprises at least two VNFCs placed in different sites;

determining, by the NFVO, a WAN connectivity for connecting the multiple sites across a WAN according to the requested WAN connectivity requirements;

returning, by the NFVO, a grant response to the VNFM; wherein, the grant response comprises a WAN infrastructure manager (WIM) identifier and a granted WAN connectivity requirement approved by the NFVO, wherein, the granted WAN connectivity requirement describes a granted requirement for managing the WAN connectivity connecting the multiple sites across the WAN; and sending, by the VNFM, a resource allocation request to the WIM according to the WIM identifier, wherein the resource allocation request comprises requested WAN network resource information derived from the granted WAN connectivity requirement.

10. The method according to claim 9, wherein the determining the WAN connectivity for connecting multiple sites according to the requested WAN connectivity requirements comprises:

determining, by the NFVO, the WAN network resource information for connecting the sites according to the requested WAN connectivity requirements.

11. The method according to claim 9, wherein the grant request further comprises the WAN network resource identifier determined by the VNFM; and the method further comprises:

determining, by the NFVO, the WAN connectivity for connecting the multiple sites according to the stored relationship between WAN network resource information comprising the WAN network resource identifier and WAN connectivity information.

12. A virtualized network function manager (VNFM), comprising:

a processor that generates a grant request for a virtualized network function (VNF) life cycle management (LCM) operation, wherein the grant request comprises a requested wide area network (WAN) connectivity requirement for connecting multiple sites that virtualized network function components (VNFCs) of the virtualized network function (VNF) instance are placed in, and the VNF to be operated comprises at least two VNFCs placed in different sites; and a network interface that sends the grant request to a network functions virtualization orchestrator (NFVO) and receives a grant response from the NFVO, wherein the grant response comprises WAN infrastructure manager (WIM) identifier and a granted WAN connectivity requirement approved by the NFVO, wherein, the granted WAN connectivity requirement describes a granted resource requirement for managing a WAN connectivity connecting the multiple sites across a WAN, wherein the network interface further sends a resource allocation request to the WIM according to the WIM identifier, wherein the resource allocation request comprises the requested WAN network resource information derived from the granted WAN connectivity requirement.

13. The VNFM according to claim 12, the requested WAN connectivity requirement is same as or different from the granted WAN connectivity requirement.

14. The VNFM according to claim 12, wherein the processor, before sending the grant request to the NFVO, receives, a VNF LCM request that comprises a VNF instance identifier, accessing to the VNF description (VNFD) according to the VNF instance identifier, and generates the requested WAN connectivity requirement for connecting the VNFCs according to the VNFD.

15. The VNFM according to claim 12, wherein:
the requested WAN connectivity requirement comprises at least one of: a set of site identifiers to be connected across the WAN, and the requested QoS requirement on the WAN connectivity.

16. The VNFM according to claim 12, wherein the processor receives a resource allocation response from the WIM, wherein the resource allocation response allocated WAN network resource information.

17. The VNFM according to claim 16, wherein the processor further records the relationship between the identifier of the operated VNF instance and the allocated WAN network resource information in the resource allocation response.

18. The VNFM according to claim 12, wherein before the network interface sends the grant request to the NFVO, the VNFM subscribes to WAN network resource information from the WIM and receives a notification comprising the WAN network resource information, wherein the WAN network resource information comprises information of available WAN network resource managed by the WIM.

19. The VNFM according to claim 12, wherein before the network interface sends the grant request to the NFVO, the VNFM further determines a WAN network resource identifier from the WAN resource information to meet the requested WAN connectivity requirement, wherein, the grant request comprises a requested Wide Area Network (WAN) connectivity requirement and/or the WAN network resource identifier determined by the VNFM.

20. A network functions virtualization orchestrator (NFVO), comprising:
a network interface that receives a grant request for a virtualized network function (VNF) life cycle management (LCM) operation from a virtualized network function manager (VNFM), wherein grant request comprises a requested wide area network (WAN) connectivity requirement for connecting multiple sites that virtualized network function components (VNFCs) of the virtualized network function (VNF) instance are place in, and the VNF to be operated comprises at least two VNFCs placed in different sites;
a processor that determines a WAN connectivity for connecting the multiple sites across a WAN according to the requested WAN connectivity requirements, wherein the network interface further returns a grant response to the VNFM;
wherein, the grant response comprises a WAN infrastructure manager (WIM) identifier and a granted WAN connectivity requirement approved by the NFVO, wherein, the granted WAN connectivity requirement describes a granted requirement for managing the WAN connectivity connecting the multiple sites across the WAN, and wherein the VNFM sends an resource allocation request to the WIM according to the WIM identifier, wherein the resource allocation request comprises requested WAN network resource information derived from the granted WAN connectivity requirement.

21. The NFVO according to claim 20, wherein the processor determines the WAN network resource information for connecting the multiple sites according to the requested WAN connectivity requirements.

22. The NFVO according to claim 20, wherein the grant request comprises a requested Wide Area Network (WAN) connectivity requirement and/or the WAN network resource identifier determined by the VNFM.

23. The NFVO according to claim 22, wherein the processor further determines the WAN connectivity for connecting the multiple sites according to the stored relationship between WAN network resource information.

* * * * *